(12) United States Patent
Tsuda et al.

(10) Patent No.: US 12,539,653 B2
(45) Date of Patent: Feb. 3, 2026

(54) INJECTION MOLDED ARTICLE

(71) Applicant: DAIKIN INDUSTRIES, LTD., Osaka (JP)

(72) Inventors: Hayato Tsuda, Osaka (JP); Tadaharu Isaka, Osaka (JP); Yumi Zenke, Osaka (JP); Yukari Yamamoto, Osaka (JP); Yasuyuki Yamaguchi, Osaka (JP); Hiroyuki Hamada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 308 days.

(21) Appl. No.: 18/453,775

(22) Filed: Aug. 22, 2023

(65) Prior Publication Data

US 2023/0390980 A1 Dec. 7, 2023

Related U.S. Application Data

(63) Continuation of application No. PCT/JP2022/007735, filed on Feb. 24, 2022.

(30) Foreign Application Priority Data

Feb. 26, 2021 (JP) ................... 2021-031090
Feb. 26, 2021 (JP) ................... 2021-031093

(51) Int. Cl.
*B29C 45/00* (2006.01)
*B29K 27/12* (2006.01)
(Continued)

(52) U.S. Cl.
CPC .......... *B29C 45/0001* (2013.01); *F16L 9/127* (2013.01); *B29K 2027/12* (2013.01); *B29K 2027/18* (2013.01); *B29K 2995/0012* (2013.01)

(58) Field of Classification Search
CPC ..... B29C 45/0001; B29C 33/42; B29C 45/00; B29C 45/26; F16L 9/127; B29K 2027/12;
(Continued)

(56) References Cited

U.S. PATENT DOCUMENTS 3,635,926 A 1/1972 Gresham et al.
3,945,786 A 3/1976 Bishop
(Continued)

FOREIGN PATENT DOCUMENTS

CN 1599757 A 3/2005
CN 103946250 A 7/2014
(Continued)

OTHER PUBLICATIONS

English machine translation for WO2020130144. (Year: 2020).*
(Continued)

*Primary Examiner* — Michael C Miggins
(74) *Attorney, Agent, or Firm* — Sughrue Mion, PLLC

(57) ABSTRACT

Provided is an injection molded article including a bottom surface section, and a side surface section erected from a peripheral edge of the bottom surface section, wherein the height from the bottom surface section of the side surface section is 3.8 cm or larger, the ratio of the height from the bottom surface section of the side surface section to the average thickness of the side surface section (height/thickness) is 19.0 or more, the load applied to the lower end section of the side surface section is 0.8 kPa or higher, the injection molded article contains a copolymer containing tetrafluoroethylene unit and a fluoro(alkyl vinyl ether) unit, the content of the fluoro(alkyl vinyl ether) unit of the copolymer is 4.5 to 6.0% by mass with respect to the whole of the monomer units, the melt flow rate at 372° C. of the copolymer is 35.0 to 60.0 g/10 min, and the number of functional groups of the copolymer is 50 or less.

8 Claims, 1 Drawing Sheet

(51) Int. Cl.
*B29K 27/18* (2006.01)
*F16L 9/127* (2006.01)

(58) Field of Classification Search
CPC ........ B29K 2027/18; B29K 2995/0012; B29K 2227/12; C08F 8/00; C08F 214/18; C08F 214/26; C08J 5/18; H01B 7/02; H01B 21/6704
See application file for complete search history.

(56) References Cited

U.S. PATENT DOCUMENTS

| | | |
|---|---|---|
| 4,029,868 A | 6/1977 | Carlson |
| 4,262,101 A | 4/1981 | Hartwimmer et al. |
| 4,414,356 A | 11/1983 | Michel |
| 4,510,300 A | 4/1985 | Levy |
| 4,743,658 A | 5/1988 | Imbalzano et al. |
| 4,902,444 A | 2/1990 | Kolouch |
| 5,000,875 A | 3/1991 | Kolouch |
| 5,656,392 A | 8/1997 | Sano et al. |
| 5,767,198 A | 6/1998 | Shimizu et al. |
| 5,851,693 A | 12/1998 | Sano et al. |
| 6,069,215 A | 5/2000 | Araki et al. |
| 6,096,795 A | 8/2000 | Abusleme et al. |
| 6,689,833 B1 | 2/2004 | Bidstrup et al. |
| 6,713,183 B2 | 3/2004 | Araki et al. |
| 6,740,375 B1 | 5/2004 | Sagisaka et al. |
| 6,774,196 B1 | 8/2004 | Taira et al. |
| 11,826,975 B2 | 11/2023 | Imamura et al. |
| 2002/0011692 A1 | 1/2002 | Lahijani |
| 2002/0099143 A1 | 7/2002 | Namura |
| 2003/0013791 A1 | 1/2003 | Blong et al. |
| 2003/0109646 A1 | 6/2003 | Kubo et al. |
| 2003/0114615 A1 | 6/2003 | Sumi et al. |
| 2003/0190530 A1 | 10/2003 | Yang et al. |
| 2003/0216531 A1 | 11/2003 | Aten et al. |
| 2004/0072935 A1 | 4/2004 | Blong et al. |
| 2004/0102572 A1 | 5/2004 | Kubo et al. |
| 2004/0204536 A1 | 10/2004 | Miyatani et al. |
| 2004/0260044 A1 | 12/2004 | Earnest, Jr. et al. |
| 2005/0020792 A1 | 1/2005 | Aoyama et al. |
| 2007/0112155 A1 | 5/2007 | Takase et al. |
| 2007/0149734 A1 | 6/2007 | Sakakibara et al. |
| 2007/0281166 A1 | 12/2007 | Nishio |
| 2008/0038627 A1 | 2/2008 | Yamauchi et al. |
| 2008/0114143 A1 | 5/2008 | Brothers et al. |
| 2009/0038821 A1 | 2/2009 | Sato et al. |
| 2009/0044965 A1 | 2/2009 | Kono et al. |
| 2009/0176952 A1 | 7/2009 | Funaki et al. |
| 2009/0246435 A1 | 10/2009 | Shimono et al. |
| 2010/0063214 A1 | 3/2010 | Kasahara et al. |
| 2010/0212929 A1 | 8/2010 | Ishii et al. |
| 2010/0273047 A1 | 10/2010 | Kunoike et al. |
| 2010/0314153 A1 | 12/2010 | Ishii et al. |
| 2010/0314154 A1 | 12/2010 | Kitahara et al. |
| 2011/0052970 A1 | 3/2011 | Kurata et al. |
| 2011/0052977 A1 | 3/2011 | Kurata et al. |
| 2011/0104562 A1 | 5/2011 | Byun et al. |
| 2011/0203830 A1 | 8/2011 | Kono et al. |
| 2011/0272173 A1 | 11/2011 | Shiotsuki et al. |
| 2012/0035329 A1 | 2/2012 | Isogai et al. |
| 2012/0094169 A1 | 4/2012 | Kim et al. |
| 2013/0130100 A1 | 5/2013 | Kurata et al. |
| 2014/0227533 A1 | 8/2014 | Murakami et al. |
| 2014/0287177 A1 | 9/2014 | Suda et al. |
| 2014/0378616 A1 | 12/2014 | Nakano et al. |
| 2015/0041145 A1 | 2/2015 | Colaianna et al. |
| 2015/0148481 A1 | 5/2015 | Brothers et al. |
| 2015/0158988 A1 | 6/2015 | Sawaki et al. |
| 2016/0006004 A1 | 1/2016 | Ogawa et al. |
| 2016/0108159 A1 | 4/2016 | Sekiguchi et al. |
| 2016/0272805 A1 | 9/2016 | Nakanishi et al. |
| 2016/0319089 A1 | 11/2016 | Imamura et al. |
| 2016/0322128 A1 | 11/2016 | Imamura et al. |
| 2017/0008986 A1 | 1/2017 | Isaka et al. |
| 2017/0025204 A1 | 1/2017 | Chapman et al. |
| 2017/0154707 A1 | 6/2017 | Abe et al. |
| 2017/0214037 A1 | 7/2017 | Uematsu et al. |
| 2017/0260344 A1 | 9/2017 | Imamura et al. |
| 2018/0009204 A1 | 1/2018 | Higuchi et al. |
| 2018/0036931 A1 | 2/2018 | Higuchi et al. |
| 2018/0237566 A1 | 8/2018 | Aida et al. |
| 2018/0265654 A1 | 9/2018 | Imamura et al. |
| 2018/0283590 A1 | 10/2018 | Yokoyama et al. |
| 2019/0134939 A1 | 5/2019 | Colaianna et al. |
| 2019/0143628 A1 | 5/2019 | Colaianna et al. |
| 2019/0177453 A1 | 6/2019 | Isaka et al. |
| 2019/0193315 A1 | 6/2019 | Miyamoto et al. |
| 2019/0375929 A1 | 12/2019 | Nishimura et al. |
| 2020/0332037 A1 | 10/2020 | Isaka et al. |
| 2021/0008827 A1 | 1/2021 | Colaianna et al. |
| 2021/0008828 A1 | 1/2021 | Colaianna et al. |
| 2021/0024769 A1 | 1/2021 | Imamura et al. |
| 2021/0189031 A1 | 6/2021 | Hintzer et al. |
| 2021/0269568 A1 | 9/2021 | Imamura et al. |
| 2022/0001657 A1 | 1/2022 | Kikuchi et al. |
| 2022/0033636 A1 | 2/2022 | Nishimura et al. |
| 2022/0170573 A1 | 6/2022 | Imamura et al. |
| 2022/0181689 A1 | 6/2022 | Isaka et al. |
| 2022/0181698 A1 | 6/2022 | Isaka et al. |
| 2022/0181729 A1 | 6/2022 | Isaka et al. |
| 2022/0195088 A1 | 6/2022 | Imamura et al. |
| 2022/0213996 A1 | 7/2022 | Imamura et al. |
| 2022/0266485 A1 | 8/2022 | Tsuda et al. |
| 2022/0278403 A1 | 9/2022 | Isaka et al. |
| 2023/0227594 A1 | 7/2023 | Yamamoto et al. |
| 2023/0235107 A1 | 7/2023 | Isaka et al. |
| 2023/0235159 A1 | 7/2023 | Isaka et al. |
| 2023/0235160 A1 | 7/2023 | Isaka et al. |
| 2023/0238627 A1 | 7/2023 | Isaka et al. |
| 2023/0238628 A1 | 7/2023 | Zenke et al. |
| 2023/0238629 A1 | 7/2023 | Isaka et al. |
| 2023/0272136 A1 | 8/2023 | Zenke et al. |
| 2023/0295356 A1 | 9/2023 | Isaka et al. |
| 2023/0383031 A1 | 11/2023 | Isaka et al. |
| 2023/0383032 A1 | 11/2023 | Isaka et al. |
| 2023/0383033 A1 | 11/2023 | Zenke et al. |
| 2023/0383034 A1 | 11/2023 | Isaka et al. |
| 2023/0390977 A1 | 12/2023 | Hamada et al. |
| 2023/0390978 A1 | 12/2023 | Tsuda et al. |
| 2023/0390979 A1 | 12/2023 | Tsuda et al. |
| 2023/0390980 A1 | 12/2023 | Tsuda et al. |
| 2023/0390981 A1 | 12/2023 | Tsuda et al. |
| 2023/0391909 A1 | 12/2023 | Isaka et al. |
| 2023/0391910 A1 | 12/2023 | Isaka et al. |
| 2023/0391911 A1 | 12/2023 | Isaka et al. |
| 2023/0391912 A1 | 12/2023 | Isaka et al. |
| 2023/0391917 A1 | 12/2023 | Isaka et al. |
| 2023/0391920 A1 | 12/2023 | Isaka et al. |
| 2023/0391927 A1 | 12/2023 | Isaka |
| 2023/0391929 A1 | 12/2023 | Isaka et al. |
| 2023/0391931 A1 | 12/2023 | Isaka et al. |
| 2023/0391932 A1 | 12/2023 | Isaka et al. |
| 2023/0391933 A1 | 12/2023 | Isaka et al. |
| 2023/0392737 A1 | 12/2023 | Tsuda et al. |
| 2023/0395282 A1 | 12/2023 | Isaka et al. |
| 2023/0399431 A1 | 12/2023 | Isaka et al. |
| 2023/0399432 A1 | 12/2023 | Isaka et al. |
| 2023/0399438 A1 | 12/2023 | Isaka et al. |
| 2023/0399441 A1 | 12/2023 | Isaka et al. |
| 2023/0399443 A1 | 12/2023 | Isaka et al. |
| 2023/0406975 A1 | 12/2023 | Isaka et al. |
| 2023/0406976 A1 | 12/2023 | Isaka et al. |
| 2023/0411751 A1 | 12/2023 | Tsuda et al. |
| 2023/0415387 A1 | 12/2023 | Hamada et al. |
| 2025/0002728 A1 | 1/2025 | Zenke et al. |
| 2025/0011488 A1 | 1/2025 | Isaka et al. |
| 2025/0011490 A1 | 1/2025 | Isaka et al. |
| 2025/0011494 A1 | 1/2025 | Isaka et al. |
| 2025/0011496 A1 | 1/2025 | Yamamoto et al. |
| 2025/0011498 A1 | 1/2025 | Isaka et al. |
| 2025/0011499 A1 | 1/2025 | Isaka et al. |

(56) References Cited

U.S. PATENT DOCUMENTS

| | | |
|---|---|---|
| 2025/0011500 A1 | 1/2025 | Isaka et al. |
| 2025/0019476 A1 | 1/2025 | Isaka et al. |
| 2025/0034302 A1 | 1/2025 | Isaka et al. |

FOREIGN PATENT DOCUMENTS

| | | |
|---|---|---|
| CN | 107428144 A | 12/2017 |
| CN | 109476061 A | 3/2019 |
| CN | 110712348 A | 1/2020 |
| CN | 110790854 A | 2/2020 |
| CN | 114223086 A | 3/2022 |
| CN | 114258609 A | 3/2022 |
| CN | 116390957 A | 7/2023 |
| CN | 116867821 A | 10/2023 |
| CN | 116917346 A | 10/2023 |
| EP | 0 220 910 A2 | 5/1987 |
| EP | 0 423 995 A1 | 4/1991 |
| EP | 0 976 544 A1 | 2/2000 |
| EP | 1 462 458 A1 | 9/2004 |
| EP | 4 024 550 A1 | 7/2022 |
| EP | 4 024 575 A1 | 7/2022 |
| EP | 4 223 793 A1 | 8/2023 |
| EP | 4 223 794 A1 | 8/2023 |
| GB | 1210794 A | 10/1970 |
| JP | 48-20788 B1 | 6/1973 |
| JP | 58-132512 A | 8/1983 |
| JP | 58-191127 A | 11/1983 |
| JP | 59-120433 A | 7/1984 |
| JP | 62-104822 A | 5/1987 |
| JP | 62-53019 B2 | 11/1987 |
| JP | 1-53167 B2 | 11/1989 |
| JP | 2-129253 A | 5/1990 |
| JP | 3-184209 A | 8/1991 |
| JP | 3-247609 A | 11/1991 |
| JP | 4-357398 A | 12/1992 |
| JP | 6-1902 A | 1/1994 |
| JP | 6-40813 B2 | 6/1994 |
| JP | 6-287405 A | 10/1994 |
| JP | 7-16869 A | 1/1995 |
| JP | 7-112449 A | 5/1995 |
| JP | 7-188337 A | 7/1995 |
| JP | 7-290496 A | 11/1995 |
| JP | 8-207106 A | 8/1996 |
| JP | 8-321287 A | 12/1996 |
| JP | 9-245832 A | 9/1997 |
| JP | 10-87746 A | 4/1998 |
| JP | 10-275604 A | 10/1998 |
| JP | 10-292054 A | 11/1998 |
| JP | 2001-151825 A | 6/2001 |
| JP | 2001-151826 A | 6/2001 |
| JP | 2001-283907 A | 10/2001 |
| JP | 2001-283921 A | 10/2001 |
| JP | 2002-53620 A | 2/2002 |
| JP | 2002-63934 A | 2/2002 |
| JP | 2002-167488 A | 6/2002 |
| JP | 2003-327770 A | 11/2003 |
| JP | 2003-534940 A | 11/2003 |
| JP | 2004-256406 A | 9/2004 |
| JP | 2004-534131 A | 11/2004 |
| JP | 2005-523979 A | 8/2005 |
| JP | 2005-298659 A | 10/2005 |
| JP | 2005-320497 A | 11/2005 |
| JP | 2006-117912 A | 5/2006 |
| JP | 2006-312736 A | 11/2006 |
| JP | 2007-238960 A | 9/2007 |
| JP | 2008-66254 A | 3/2008 |
| JP | 2009-42478 A | 2/2009 |
| JP | 2009-59690 A | 3/2009 |
| JP | 2009-235564 A | 10/2009 |
| JP | 2009-272207 A | 11/2009 |
| JP | 2010-56079 A | 3/2010 |
| JP | 2010-509443 A | 3/2010 |
| JP | 2010-85741 A | 4/2010 |
| JP | 2010-162817 A | 7/2010 |
| JP | 2010-235667 A | 10/2010 |
| JP | 2011-48976 A | 3/2011 |
| JP | 2011-71104 A | 4/2011 |
| JP | 2012-54269 A | 3/2012 |
| JP | 2012-80911 A | 4/2012 |
| JP | 2012-106494 A | 6/2012 |
| JP | 2012-130557 A | 7/2012 |
| JP | 2013-71341 A | 4/2013 |
| JP | 2013-82888 A | 5/2013 |
| JP | 2013-177574 A | 9/2013 |
| JP | 2014-28951 A | 2/2014 |
| JP | 2014-59052 A | 4/2014 |
| JP | 2014-187040 A | 10/2014 |
| JP | 2015-7218 A | 1/2015 |
| JP | 2015-519410 A | 7/2015 |
| JP | 2015-147924 A | 8/2015 |
| JP | 2015-168840 A | 9/2015 |
| JP | 2016-537499 A | 12/2016 |
| JP | 2017-197690 A | 11/2017 |
| JP | 2018-20468 A | 2/2018 |
| JP | 2018-514598 A | 6/2018 |
| JP | 2018-523272 A | 8/2018 |
| JP | 2018-159090 A | 10/2018 |
| JP | 2019-172962 A | 10/2019 |
| JP | 2019-210420 A | 12/2019 |
| JP | 2019-214641 A | 12/2019 |
| JP | 2020-2341 A | 1/2020 |
| JP | 2020-15906 A | 1/2020 |
| JP | 2020-29042 A | 2/2020 |
| JP | 2020-100823 A | 7/2020 |
| JP | 2020-100843 A | 7/2020 |
| JP | 2021-6648 A | 1/2021 |
| JP | 2021-141043 A | 9/2021 |
| JP | 2021-141045 A | 9/2021 |
| JP | 2022-19196 A | 1/2022 |
| KR | 10-2004-0071160 A | 8/2004 |
| KR | 10-2019-0034205 A | 4/2019 |
| WO | 95/29956 A1 | 11/1995 |
| WO | 01/40331 A1 | 6/2001 |
| WO | 03/006566 A1 | 1/2003 |
| WO | 03/048214 A1 | 6/2003 |
| WO | 2004/052987 A1 | 6/2004 |
| WO | 2008/032613 A1 | 3/2008 |
| WO | 2008/047759 A1 | 4/2008 |
| WO | 2008/047906 A1 | 4/2008 |
| WO | 2008/143069 A1 | 11/2008 |
| WO | 2010/113864 A1 | 10/2010 |
| WO | 2013/115374 A1 | 8/2013 |
| WO | 2014/007346 A1 | 1/2014 |
| WO | 2014/129413 A1 | 8/2014 |
| WO | 2015/119053 A1 | 8/2015 |
| WO | 2016/117492 A1 | 7/2016 |
| WO | 2017/056203 A1 | 4/2017 |
| WO | 2017/082417 A1 | 5/2017 |
| WO | 2019/003265 A1 | 1/2019 |
| WO | 2020/004083 A1 | 1/2020 |
| WO | 2020/090981 A1 | 5/2020 |
| WO | 2020/204163 A1 | 10/2020 |
| WO | 2021/033539 A1 | 2/2021 |
| WO | 2021/039862 A1 | 3/2021 |
| WO | 2021/039863 A1 | 3/2021 |
| WO | 2021/039865 A1 | 3/2021 |
| WO | 2021039864 A1 | 3/2021 |
| WO | 2021/059753 A1 | 4/2021 |
| WO | 2022/181225 A1 | 1/2022 |

OTHER PUBLICATIONS

European Search Report issued Feb. 10, 2025 for European Patent Application No. 22759283.9.

European Search Report issued Feb. 20, 2025 for European Patent Application No. 22759263.1.

International Search Report dated Jun. 20, 2023 in International Application No. PCT/JP2023/013284.

International Search Report dated Jun. 6, 2023 in International Application No. PCT/JP2023/013285.

International Search Report dated Jun. 6, 2023 for International Application No. PCT/JP2023/013289.

(56) References Cited

OTHER PUBLICATIONS

International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
Translation of the International Search Report issued Oct. 13, 2020 in International Application No. PCT/JP2020/032236.
Translation of the International Search Report issued Oct. 13, 2020 in International Application No. PCT/JP2020/032237.
Translation of the International Search Report issued Oct. 13, 2020 in International Application No. PCT/JP2020/032238.
Translation of the International Search Report issued Oct. 13, 2020 in International Application No. PCT/JP2020/032239.
Translation of the International Search Report issued Oct. 6, 2020 in International Application No. PCT/JP2020/032234.
International Preliminary Report on Patentability, with Translation of Written Opinion issued Mar. 1, 2022 in International Application No. PCT/JP2020/032238.
International Preliminary Report on Patentability, with Translation of Written Opinion issued Mar. 1, 2022 in International Application No. PCT/JP2020/032239.
International Preliminary Report on Patentability, with Translation of Written Opinion issued Mar. 1, 2022 in International Application No. PCT/JP2020/032236.
International Preliminary Report on Patentability, with Translation of Written Opinion issued Mar. 1, 2022 in International Application No. PCT/JP2020/032237.
International Preliminary Report on Patentability, with Translation of Written Opinion issued Mar. 1, 2022 in International Application No. PCT/JP2020/032234.
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 1, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.

(56) References Cited

OTHER PUBLICATIONS

Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
European Search Report issued Aug. 2, 2023 for European Patent Application No. 20 857 704.9.
International Preliminary Report on Patentability, with Translation of Written Opinion issued Aug. 29, 2023 in International Application No. PCT/JP2022/003634.
International Preliminary Report on Patentability, with Translation of Written Opinion issued Aug. 29, 2023 in International Application No. PCT/JP2022/003635.
International Preliminary Report on Patentability, with Translation of Written Opinion issued Aug. 29, 2023 in International Application No. PCT/JP2022/003636.
International Preliminary Report on Patentability, with Translation of Written Opinion issued Aug. 29, 2023 in International Application No. PCT/JP2022/003637.
International Preliminary Report on Patentability, with Translation of Written Opinion issued Aug. 29, 2023 in International Application No. PCT/JP2022/003638.
International Preliminary Report on Patentability, with Translation of Written Opinion issued Aug. 29, 2023 in International Application No. PCT/JP2022/003640.
International Preliminary Report on Patentability, with Translation of Written Opinion issued Aug. 29, 2023 in International Application No. PCT/JP2022/003641.
International Preliminary Report on Patentability, with Translation of Written Opinion issued Aug. 29, 2023 in International Application No. PCT/JP2022/003642.
International Preliminary Report on Patentability, with Translation of Written Opinion issued Aug. 29, 2023 in International Application No. PCT/JP2022/003643.
International Preliminary Report on Patentability, with Translation of Written Opinion issued Aug. 29, 2023 in International Application No. PCT/JP2022/003644.
International Preliminary Report on Patentability, with Translation of Written Opinion issued Aug. 29, 2023 in International Application No. PCT/JP2022/003645.
International Preliminary Report on Patentability, with Translation of Written Opinion issued Aug. 29, 2023 in International Application No. PCT/JP2022/003646.
International Preliminary Report on Patentability, with Translation of Written Opinion issued Aug. 29, 2023 in International Application No. PCT/JP2022/003647.
International Preliminary Report on Patentability, with Translation of Written Opinion issued Aug. 29, 2023 in International Application No. PCT/JP2022/003648.
International Preliminary Report on Patentability, with Translation of Written Opinion issued Aug. 29, 2023 in International Application No. PCT/JP2022/003649.
International Preliminary Report on Patentability, with Translation of Written Opinion issued Aug. 29, 2023 in International Application No. PCT/JP2022/003650.
International Preliminary Report on Patentability, with Translation of Written Opinion issued Aug. 29, 2023 in International Application No. PCT/JP2022/003651.
International Preliminary Report on Patentability, with Translation of Written Opinion issued Aug. 29, 2023 in International Application No. PCT/JP2022/003652.
International Preliminary Report on Patentability, with Translation of Written Opinion issued Aug. 29, 2023 in International Application No. PCT/JP2022/003653.
International Preliminary Report on Patentability, with Translation of Written Opinion issued Aug. 29, 2023 in International Application No. PCT/JP2022/003654.
International Preliminary Report on Patentability, with Translation of Written Opinion issued Aug. 29, 2023 in International Application No. PCT/JP2022/003657.
International Preliminary Report on Patentability, with Translation of Written Opinion issued Aug. 29, 2023 in International Application No. PCT/JP2022/003658.
International Preliminary Report on Patentability, with Translation of Written Opinion issued Aug. 29, 2023 in International Application No. PCT/JP2022/003659.
International Preliminary Report on Patentability, with Translation of Written Opinion issued Aug. 29, 2023 in International Application No. PCT/JP2022/003660.
International Preliminary Report on Patentability, with Translation of Written Opinion issued Aug. 29, 2023 in International Application No. PCT/JP2022/003661.
International Preliminary Report on Patentability, with Translation of Written Opinion issued Aug. 29, 2023 in International Application No. PCT/JP2022/003664.
International Preliminary Report on Patentability, with Translation of Written Opinion issued Aug. 29, 2023 in International Application No. PCT/JP2022/003665.

(56) References Cited

OTHER PUBLICATIONS

International Preliminary Report on Patentability, with Translation of Written Opinion issued Aug. 29, 2023 in International Application No. PCT/JP2022/007735.
International Preliminary Report on Patentability, with Translation of Written Opinion issued Aug. 29, 2023 in International Application No. PCT/JP2022/007737.
International Preliminary Report on Patentability, with Translation of Written Opinion issued Aug. 29, 2023 in International Application No. PCT/JP2022/007738.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al., "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).

* cited by examiner

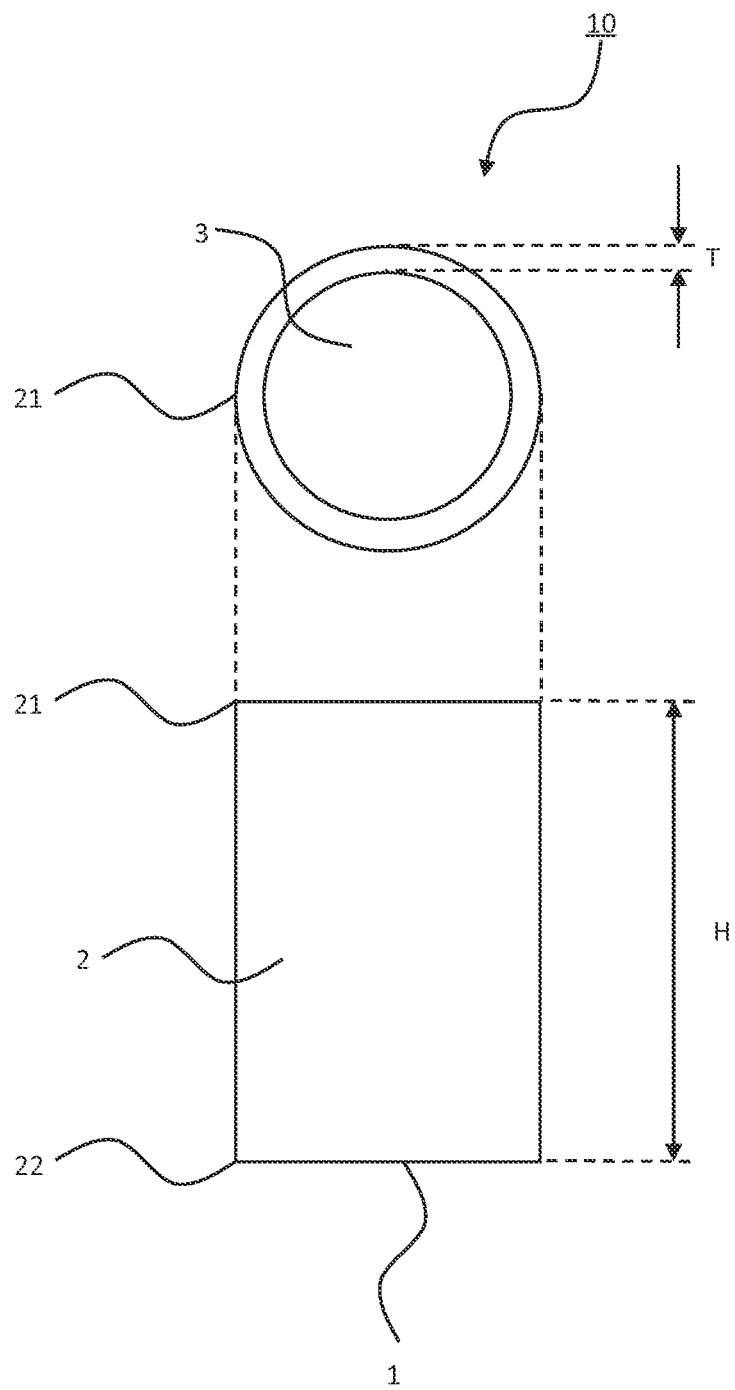

INJECTION MOLDED ARTICLE

CROSS-REFERENCE TO RELATED APPLICATIONS

This application is a Rule 53(b) Continuation of International Application No. PCT/JP2022/007735 filed Feb. 24, 2022, which claims priorities based on Japanese Patent Application No. 2021-031093 filed Feb. 26, 2021 and Japanese Patent Application No. 2021-031090 filed Feb. 26, 2021, the respective disclosures of which are incorporated herein by reference in their entirety.

TECHNICAL FIELD

The present disclosure relates to an injection molded article.

BACKGROUND ART

A semiconductor production process usually includes a step of processing a wafer with water or a chemical solution. As an apparatus used in such a processing step, for example, Patent Document 1 describes a semiconductor cleaning apparatus comprising a wafer spin base like a rotary table which can rotatably fix a wafer to be cleaned on the upper surface, the wafer spin base being arranged in a wafer cup consisting of a concave container.

Patent Document 2 describes an injection molded article which is obtained by injection molding a composition containing a hot melt fluororesin and has a projection area of 1,100 cm 2 or higher in an injection direction.

RELATED ART

Patent Documents

Patent Document 1: Japanese Patent Laid-Open No. 2012-54269
Patent Document 2: Japanese Patent Laid-Open No. 2013-71341

SUMMARY

According to the present disclosure, there is provided an injection molded article comprising a bottom surface section, and a side surface section erected from a peripheral edge of the bottom surface section, wherein a height from the bottom surface section of the side surface section is 3.8 cm or larger, a ratio of the height from the bottom surface section of the side surface section to an average thickness of the side surface section (height/thickness) is 19.0 or more, a load applied to a lower end section of the side surface section is 0.8 kPa or higher, the injection molded article contains a copolymer containing tetrafluoroethylene unit and a fluoro(alkyl vinyl ether) unit, a content of the fluoro(alkyl vinyl ether) unit of the copolymer is 4.5 to 6.0% by mass with respect to the whole of the monomer units, a melt flow rate at 372° C. of the copolymer is 35.0 to 60.0 g/10 min, and the number of functional groups of the copolymer is 50 or less.

Effects

According to the present disclosure, there can be provided an injection molded article having a large height of the side surface section and a small thickness in the side surface section, wherein the injection molded article is excellent in all of the abrasion resistance at high temperatures, the crack resistance at high temperatures and the deformation resistance at high temperatures and has a beautiful appearance.

BRIEF DESCRIPTION OF DRAWING

The FIGURE is a front view and a plan view of one embodiment of the injection molded article of the present disclosure.

DESCRIPTION OF EMBODIMENTS

Hereinafter, specific embodiments of the present disclosure will be described in detail, but the present disclosure is not limited to the following embodiments.

The injection molded article of the present disclosure comprises a bottom surface section, and a side surface section erected from a peripheral edge of the bottom surface section.

The FIGURE is a front view and a plan view of one embodiment of the injection molded article of the present disclosure. An injection molded article 10 shown in the FIGURE comprises a bottom surface section 1 and a side surface section 2. An opening 3 is formed on an upper end section 21 of the side surface section 2 so that, for example, a wafer spin base which can rotatably fix a wafer to be cleaned on the upper surface can be installed in the injection molded article.

Injection molded articles used in a processing apparatus for processing a wafer with water or a chemical solution are typically large, as described in Patent Document 2. In addition, such injection molded articles are required to have the chemical resistance, and are thus produced by injection molding a fluororesin.

When a wafer spin base or the like is installed in an injection molded article used in a processing apparatus, water or a chemical solution to be used for cleaning a wafer is scattered from the wafer. To prevent the water or chemical solution from scattering to the outside, a larger height of the side surface section of the injection molded article is more preferable. Since the fluororesin has a fluorine atom bonded to a carbon atom constituting a polymer and has a relatively high specific gravity, the weight of the injection molded article tends to be large. Therefore, from the viewpoint of reducing the weight of the injection molded article, a smaller thickness of the side surface section of the injection molded article is more preferable.

However, when the height of the side surface section of the injection molded article is large and the thickness of the side surface section is small, there is a problem in that the side surface section likely deforms by its own weight. When the height of the side surface section is large, there is a problem in that the load applied to the lower end section of the side surface section (the peripheral edge section of the bottom surface section) is large, the lower end section of the side surface section (the peripheral edge section of the bottom surface) of the injection molded article is likely abraded and damaged at high temperatures. On the other hand, when it is intended to solve these problems, it is difficult to obtain a beautiful injection molded article in which the surface is smooth and no flow marks were observed, which is problematic. For example, when the surface smoothness of the injection molded article deteriorates, the water or droplet attached to the injection molded article hardly runs down, and more frequent cleaning of the processing apparatus may be required.

On the contrary, due to that the injection molded article of the present disclosure is obtained by forming a copolymer in which the content of the FAVE unit, MFR and the number of functional groups are suitably adjusted into an injection molded article comprising a thin and high side surface section, the injection molded article of the present disclosure has a beautiful appearance despite having a thin and high side surface section, the side surface section hardly deforms even in use in a high temperature environment, and furthermore, the side surface section and the lower end section of the side surface section are hardly abraded and damaged even in a high temperature environment.

The injection molded article according to one embodiment of the present disclosure comprises the side surface section 2 having a height (H) of 3.8 cm or larger, as shown in the FIGURE. The height (H) is the height from the bottom surface section 1 of the side surface section 2 (a lower end section 22 of the side surface section) to the upper end section 21 of the side surface section. The height (H) is preferably 4.5 cm or larger, more preferably 5.0 cm or larger, and still more preferably 5.5 cm or larger. The height (H) may be, for example, 30 cm or smaller, and 15 cm or smaller. By making the height (H) of the side surface section 2 sufficiently large, the scattering of water or a chemical solution to the outside can be suppressed.

The injection molded article according to one embodiment of the present disclosure has an average thickness of the side surface section 2 (T) such that the ratio of the height from the bottom surface section 1 of the side surface section 2 (H) to the average thickness of the side surface section 2 (T), (height (H)/thickness (T)), is 19.0 or more, as shown in the FIGURE. The thickness of the side surface section 2 may be non-uniform or uniform, as shown in the FIGURE. The average thickness (T) is the average value of the thickness of the side surface section 2. The ratio (height (H)/thickness (T)) is preferably 22.5 or more, more preferably 25.0 or more, and still more preferably 27.4 or more. The ratio (height (H)/thickness (T)) may be, for example, 50.0 or less, 40.0 or less, and 30.0 or less. By making the ratio (height (H)/thickness (T)) sufficiently large, the scattering prevention effect obtained by increasing the height of the side surface section 2 and the weight reduction achieved by reducing the thickness can be highly balanced.

In the injection molded article of the present disclosure, due to that the side surface section 2 is formed from a copolymer having a relatively high specific gravity and the height is large, the load applied to the lower end section 22 of the side surface section 2 is large. The load applied to the lower end section 22 of the side surface section 2 is 0.8 kPa or higher, preferably 0.9 kPa or higher, still more preferably 1.0 kPa or higher, and especially preferably 1.1 kPa or higher. In the injection molded article of the present disclosure, when the load applied to the lower end section 22 of the side surface section 2 is large, the lower end section 22 of the side surface section 2 is hardly abraded and damaged.

In the injection molded article of the present disclosure, the side surface section 2 is formed from a copolymer having a relatively large specific gravity. The specific gravity of the side surface section 2 is, for example, 2.05 to 2.25 g/cm$^3$.

In the injection molded article 10 shown in the FIGURE, the bottom surface section 1 has a circular shape, but the shape of the bottom surface section 1 is not limited, and for example, may be a substantially circular shape or a substantially elliptical shape. In addition, a hole for inserting a tube, a rotation shaft, or the like into the injection molded article, a hole for installing a bolt, or the like may be provided on the bottom surface section 1 or the side surface section 2.

The size of the bottom surface section 1 of the injection molded article of the present disclosure is not limited, but may be large. The formed article of the present disclosure may have, for example, the bottom surface section 1 larger than the wafer (semiconductor wafer) having a diameter of at least 300 mm or at least 450 mm. The area of the bottom surface section 1 of the present disclosure is preferably 1,000 cm 2 or higher, and more preferably 1,100 cm 2 or higher, and 5,000 cm 2 or lower.

The injection molded article of the present disclosure contains a copolymer containing tetrafluoroethylene (TFE) unit and a fluoro(alkyl vinyl ether) (FAVE) unit. The copolymer is a melt-fabricable fluororesin. Being melt-fabricable means that a polymer can be melted and processed by using a conventional processing device such as an extruder or an injection molding machine.

Examples of the FAVE constituting the above FAVE unit include at least one selected from the group consisting of a monomer represented by the general formula (1):

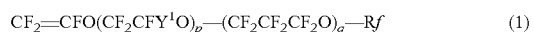
$$CF_2=CFO(CF_2CFY^1O)_p-(CF_2CF_2CF_2O)_q-Rf \qquad (1)$$

wherein Y$^1$ represents F or CF$_3$, and Rf represents a perfluoroalkyl group having 1 to 5 carbon atoms; p represents an integer of 0 to 5; and q represents an integer of 0 to 5, and a monomer represented by the general formula (2):

$$CFX=CXOCF_2OR^1 \qquad (2)$$

wherein X is the same or different and represents H, F or CF$_3$; R$^1$ represents a linear or branched fluoroalkyl group having 1 to 6 carbon atoms which may contain one or two atoms of at least one selected from the group consisting of H, Cl, Br and I, or a cyclic fluoroalkyl group having 5 or 6 carbon atoms which may contain one or two atoms of at least one selected from the group consisting of H, Cl, Br and I.

Among them, the above FAVE is preferably the monomer represented by the general formula (1), more preferably at least one selected from the group consisting of perfluoro (methyl vinyl ether), perfluoro(ethyl vinyl ether) (PEVE) and perfluoro(propyl vinyl ether) (PPVE), still more preferably at least one selected from the group consisting of PEVE and PPVE, and particularly preferably PPVE.

The content of the FAVE unit of the copolymer is 4.5 to 6.0% by mass with respect to the whole of the monomer units. The content of the FAVE unit of the copolymer is more preferably 4.6% by mass or higher, and still more preferably 4.7% by mass or higher, and more preferably 5.9% by mass or lower, still more preferably 5.8% by mass or lower, further still more preferably 5.7% by mass or lower, and especially preferably 5.6% by mass or lower. When the content of the FAVE unit of the copolymer is too high, the deformation resistance at high temperatures of the injection molded article deteriorates. When the content of the FAVE unit of the copolymer is too low, the abrasion resistance at high temperatures and the crack resistance at high temperatures of the injection molded article deteriorate.

The content of the TFE unit of the copolymer is, with respect to the whole of the monomer units, preferably 94.0 to by mass, more preferably 94.1% by mass or higher, still more preferably 94.2% by mass or higher, further still more preferably 94.3% by mass or higher, and especially preferably 94.4% by mass or higher, and more preferably 95.4% by mass or lower, and further preferably 95.3% by mass or lower. When the content of the TFE unit of the copolymer is too low, the deformation resistance at high temperatures of the injection molded article may deteriorate. When the content of the TFE unit of the copolymer is too high, the abrasion resistance at high temperatures and the crack resistance at high temperatures of the injection molded article may deteriorate.

In the present disclosure, the content of each monomer unit in the copolymer is measured by a $^{19}$F-NMR method.

The copolymer can also contain a monomer unit originated from a monomer copolymerizable with TFE and FAVE. In this case, the content of the monomer unit copolymerizable with TFE and FAVE is, with respect to the whole of the monomer units of the copolymer, preferably 0 to 1.5% by mass, more preferably to 0.5% by mass, and still more preferably 0.1 to 0.3% by mass.

The monomers copolymerizable with TFE and FAVE may include hexafluoropropylene (HFP), vinyl monomers represented by $CZ^1Z^2$=$CZ^3$ $(CF_2)_nZ^4$ wherein $Z^1$, $Z^2$ and $Z^3$ are identical or different, and represent H or F; $Z^4$ represents H, F or Cl; and n represents an integer of 2 to 10, and alkyl perfluorovinyl ether derivatives represented by $CF_2$=CF—$OCH_2$—$Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the FAVE unit, and TFE/HFP/FAVE copolymer, and is more preferably a copolymer consisting only of the TFE unit and the FAVE unit.

The melt flow rate (MFR) of the copolymer is 35.0 to g/10 min. The MFR of the copolymer is preferably 36.0 g/10 min or higher, more preferably 37.0 g/10 min or higher, and still more preferably 38.0 g/10 min or higher, and preferably 58.0 g/10 min or lower, more preferably 56.0 g/10 min or lower, and still more preferably 55.0 g/10 min or lower. When the MFR of the copolymer is too low, the injection molded article having a beautiful appearance cannot be obtained. When the MFR of the copolymer is too high, the abrasion resistance at high temperatures and the crack resistance at high temperatures of the injection molded article deteriorate.

In the present disclosure, the MFR is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The MFR can be regulated by regulating the kind and amount of a polymerization initiator to be used in polymerization of monomers, the kind and amount of a chain transfer agent, and the like.

In the present disclosure, the number of functional groups per $10^6$ main-chain carbon atoms of the copolymer is 50 or less, preferably 40 or less, more preferably 30 or less, still more preferably 20 or less, further still more preferably 15 or less, especially preferably 10 or less, and most preferably less than 6. When the number of functional groups of the copolymer is too high, the crack resistance at high temperatures of the injection molded article deteriorates.

For identification of the kind of the functional groups and measurement of the number of the functional groups, infrared spectroscopy can be used.

The number of the functional groups is measured, specifically, by the following method. First, the copolymer is formed by cold press to prepare a film of 0.25 to 0.30 mm in thickness. The film is analyzed by Fourier transform infrared spectroscopy to obtain an infrared absorption spectrum of the copolymer, and a difference spectrum against a base spectrum that is completely fluorinated and has no functional groups is obtained. From an absorption peak of a specific functional group observed on this difference spectrum, the number N of the functional group per $1 \times 10^6$ carbon atoms in the copolymer is calculated according to the following formula (A).

$$N = I \times K / t \tag{A}$$

I: absorbance
K: correction factor
t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2$=$CF_2$ |

Absorption frequencies of —CH$_2$CF$_2$H, —CH$_2$COF, —CH$_2$COOH, —CH$_2$COOCH$_3$ and —CH$_2$CONH$_2$ are lower by a few tens of kaysers (cm$^{-1}$) than those of —CF$_2$H, —COF, —COOH free and —COOH bonded, —COOCH$_3$ and —CONH$_2$ shown in the Table, respectively.

For example, the number of the functional group —COF is the sum of the number of a functional group determined from an absorption peak having an absorption frequency of 1,883 cm$^{-1}$ derived from —CF$_2$COF and the number of a functional group determined from an absorption peak having an absorption frequency of 1,840 cm$^{-1}$ derived from —CH$_2$COF.

The functional groups are ones present on main chain terminals or side chain terminals of the copolymer, and ones present in the main chain or the side chains. The number of the functional groups may be the sum of numbers of —CF=CF$_2$, —CF$_2$H, —COF, —COOH, —COOCH$_3$, —CONH$_2$ and —CH$_2$OH.

The functional groups are introduced to the copolymer by, for example, a chain transfer agent or a polymerization initiator used for production of the copolymer. For example, in the case of using an alcohol as the chain transfer agent, or a peroxide having a structure of —CH$_2$OH as the polymerization initiator, —CH$_2$OH is introduced on the main chain terminals of the copolymer. Alternatively, the functional group is introduced on the side chain terminal of the copolymer by polymerizing a monomer having the functional group.

The copolymer satisfying the above range regarding the number of functional groups can be obtained by subjecting the copolymer to a fluorination treatment. That is, the copolymer contained in the injection molded article of the present disclosure is preferably one which is subjected to the fluorination treatment. Further, the copolymer contained in the injection molded article of the present disclosure preferably has —CF$_3$ terminal groups.

The melting point of the copolymer is preferably 295 to 315° C., more preferably 300° C. or higher, still more preferably 301° C. or higher, and especially preferably 302° C. or higher, and more preferably 310° C. or lower, and still more preferably 305° C. or lower. Due to that the melting point is in the above range, the abrasion resistance at high temperatures, the crack resistance at high temperatures and the deformation resistance at high temperatures of the injection molded article are further improved, and the appearance is further beautiful.

In the present disclosure, the melting point can be measured by using a differential scanning calorimeter [DSC].

The injection molded article of the present disclosure may contain other components such as fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber. The electrically conductive agents include carbon black. The plasticizers include dioctyl phthalate and pentaerythritol. The processing aids include carnauba wax, sulfone compounds, low molecular weight polyethylene and fluorine-based auxiliary agents. The dehydrofluorination agents include organic oniums and amidines.

As the above-mentioned other components, other polymers other than the copolymer may be used. The other polymers include fluororesins other than the copolymer, fluoroelastomer, and non-fluorinated polymers.

The copolymer contained in the injection molded article of the present disclosure can be produced by a polymerization method such as suspension polymerization, solution polymerization, emulsion polymerization or bulk polymerization. The polymerization method is preferably emulsion polymerization or suspension polymerization. In these polymerization methods, conditions such as temperature and pressure, and a polymerization initiator and other additives can suitably be set depending on the formulation and the amount of the copolymer.

As the polymerization initiator, an oil-soluble radical polymerization initiator, or a water-soluble radical polymerization initiator may be used.

The oil-soluble radical polymerization initiator may be a known oil-soluble peroxide, and examples thereof typically include:

dialkyl peroxycarbonates such as di-n-propyl peroxydicarbonate, diisopropyl peroxydicarbonate, di-sec-butyl peroxydicarbonate and di-2-ethoxyethyl peroxydicarbonate;

peroxyesters such as t-butyl peroxyisobutyrate and t-butyl peroxypivalate;

dialkyl peroxides such as di-t-butyl peroxide; and di[fluoro(or fluorochloro)acyl] peroxides.

The di[fluoro(or fluorochloro)acyl] peroxides include diacyl peroxides represented by [(RfCOO)—]$_2$ wherein Rf is a perfluoroalkyl group, an ω-hydroperfluoroalkyl group or a fluorochloroalkyl group.

Examples of the di[fluoro(or fluorochloro)acyl] peroxides include di(ω-hydro-dodecafluorohexanoyl) peroxide, di(ω-hydro-tetradecafluoroheptanoyl) peroxide, di(ω-hydro-hexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydrodo-decafluoroheptanoyl-ω-hydrohexadecafluorononanoyl peroxide, ω-chloro-hexafluorobutyryl-ω-chlorodecafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid, percarbonic acid and the like, organic peroxides such as disuccinoyl peroxide and diglutaroyl peroxide, and t-butyl permaleate and t-butyl hydroperoxide. A reductant such as a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known.

The surfactant may be a known surfactant, for example, nonionic surfactants, anionic surfactants and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be inserted between carbon atoms). The amount of the surfactant to be added (with respect to water in the polymerization) is preferably 50 to 5,000 ppm.

Examples of the chain transfer agent include hydrocarbons such as ethane, isopentane, n-hexane and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as CH$_3$CClF$_2$, CH$_3$CCl$_2$F, CF$_3$CF$_2$CCl$_2$H and CF$_2$ClCF$_2$CFHCl; chlorofluoroalkanes such as $CF_2ClCFClCF_2CF_3$ and $CF_3CFClCFClCF_3$; hydrofluroalkanes such as $CF_3CFHCFHCF_2CF_2CF_3$, $CF_2HCF_2CF_2CF_2CF_2H$ and $CF_3CF_2CF_2CF_2CF_2CF_2CF_2H$; hydrofluoroethers such as $CH_3OC_2F_5$, $CH_3OC_3F_5, CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ and $CF_3CHFCF_2OCH_2CF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100% by mass with respect to an aqueous medium.

The polymerization temperature is not limited, and may be 0 to 100° C. The polymerization pressure is suitably set depending on other polymerization conditions to be used such as the kind, the amount and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The copolymer obtained by the polymerization may be formed into pellets. A method of forming into pellets is not limited, and a conventionally known method can be used. Examples thereof include methods of melt extruding the copolymer by using a single-screw extruder, a twin-screw extruder or a tandem extruder and cutting the resultant into a predetermined length to form the copolymer into pellets. The extrusion temperature in the melt extrusion needs to be varied depending on the melt viscosity and the production method of the copolymer, and is preferably the melting point of the copolymer+20° C. to the melting point of the copolymer+140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, —COOCH$_3$, —CH$_2$OH, —COF, —CF=CF$_2$ and —CONH$_2$, and thermally relatively stable functional groups thereof, such as —CF$_2$H, can be converted to thermally very stable —CF$_3$. Consequently, the total number (number of functional groups) of —COOH, —COOCH$_3$, —CH$_2$OH, —COF, —CF=CF$_2$, —CONH$_2$ and —CF$_2$H of the copolymer can easily be controlled in the above-mentioned range.

The fluorine-containing compound is not limited, but includes fluorine radical sources generating fluorine radicals under the fluorination treatment condition. The fluorine radical sources include $F_2$ gas, $CoF_3$, $AgF_2$, $UF_6$, $OF_2$, $N_2F_2$, $CF_3OF$, halogen fluorides (for example, $IF_5$ and $ClF_3$).

The fluorine radical source such as $F_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas ($F_2$ gas).

The injection molded article of the present disclosure can be produced by the method for injection molding the copolymer obtained as above using an injection molding machine and a mold provided with a gate.

The shape of the copolymer to be supplied into an injection molding machine is not limited, and a copolymer in a shape of powder, pellet, or the like can be used.

A known injection molding machine can be used. The copolymer injected from a nozzle of an injection molding machine usually passes through a sprue, a runner, and a gate, flows into a mold cavity, and is filled in the mold cavity. In the mold used for injection molding, a runner and a gate are formed, and a mold cavity for forming an injection molded article is formed.

Examples of the injection molded article of the present disclosure include an injection molded article having a cylindrical portion capable of accommodating a wafer (semiconductor wafer) having a diameter of at least 300 mm or at least 450 mm. The cylindrical portion of the injection molded article is also preferably a portion capable of accommodating a retaining means for retaining a wafer having a diameter in the above range, such as a turn base, a spin base, or a spin chuck. In a semiconductor cleaning apparatus in which a wafer is cleaned with water or a chemical solution, a semiconductor production apparatus in which a resist film is formed by coating a resist, a semiconductor production apparatus in which development of a resist film is carried out, and the like, water or a chemical solution is supplied on the wafer while rotating the wafer. Alternatively, the water or chemical solution on the wafer is blown off by rotating the wafer, thereby drying the wafer. Thus, the water or chemical solution is scattered to the periphery of the wafer. The injection molded article of the present disclosure can be utilized as a wafer cup, which can be provided on the periphery of the wafer to prevent the water or chemical solution from scattering. The wafer cup is also referred to as a cup guard, a splash guard, or the like. Due to having a thin and high side surface section, the injection molded article of the present disclosure can sufficiently prevent the water or chemical solution from scattering, and is lightweight. In addition, the injection molded article of the present disclosure is hardly abraded and deformed at high temperatures and is hardly cracked.

Although the embodiments have been described above, it will be understood that various changes in form and details are possible without departing from the gist and scope of the claims.

According to the present disclosure, there is provided an injection molded article comprising a bottom surface section, and a side surface section erected from a peripheral edge of the bottom surface section, wherein a height from the bottom surface section of the side surface section is 3.8 cm or larger, a ratio of the height from the bottom surface section of the side surface section to an average thickness of the side surface section (height/thickness) is 19.0 or more, a load applied to a lower end section of the side surface section is 0.8 kPa or higher, the injection molded article contains a copolymer containing tetrafluoroethylene unit and a fluoro(alkyl vinyl ether) unit, a content of the fluoro(alkyl vinyl ether) unit of the copolymer is 4.5 to 6.0% by mass with respect to the whole of the monomer units, a melt flow rate at 372° C. of the copolymer is 35.0 to 60.0 g/10 min, and the number of functional groups of the copolymer is 50 or less.

The specific gravity of the side surface section is preferably 2.05 to 2.25 g/cm$^3$.

The shape of the bottom surface section is preferably a substantially circular shape or a substantially elliptical shape.

It is preferable to further comprise an opening formed on the upper end of the side surface section.

The fluoro(alkyl vinyl ether) unit of the copolymer is preferably perfluoro(propyl vinyl ether) unit.

The content of the fluoro(alkyl vinyl ether) unit of the copolymer is preferably 4.7 to 5.6% by mass with respect to the whole of the monomer units.

The melt flow rate at 372° C. of the copolymer is preferably 38.0 to 55.0 g/10 min.

The melting point of the copolymer is preferably 295 to 315° C.

a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.
(Melting Point)

The polymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point was determined from a melting curve peak observed in the second temperature raising step.
(Number of Functional Groups)

Pellets of the copolymer was formed by cold press into a film of 0.25 to 0.30 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the functional group per 1×10$^6$ carbon atoms in the sample was calculated according to the following formula (A).

$$N = I \times K / t \quad \text{(A)}$$

I: absorbance
K: correction factor
t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

TABLE 2

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | C$_7$F$_{15}$COF |
| —COOH free | 1815 | 530 | 439 | H(CF$_2$)$_6$COOH |
| —COOH bonded | 1779 | 530 | 439 | H(CF$_2$)$_6$COOH |
| —COOCH$_3$ | 1795 | 680 | 342 | C$_7$F$_{15}$COOCH$_3$ |
| —CONH$_2$ | 3436 | 506 | 460 | C$_7$H$_{15}$CONH$_2$ |
| —CH$_2$OH$_2$, —OH | 3648 | 104 | 2236 | C$_7$H$_{15}$CH$_2$OH |
| —CF$_2$H | 3020 | 8.8 | 26485 | H(CF$_2$CF$_2$)$_3$CH$_2$OH |
| —CF=CF$_2$ | 1795 | 635 | 366 | CF$_2$=CF$_2$ |

EXAMPLES

Next, embodiments of the present disclosure will be described with reference to examples, but the present disclosure is not intended to be limited by these examples.

The numerical values of the Examples were measured by the following methods.
(Content of Monomer Unit)

The content of each monomer unit was measured by an NMR analyzer (for example, manufactured by Bruker BioSpin GmbH, AVANCE 300, high-temperature probe).
(Melt Flow Rate (MFR))

The polymer was made to flow out from a nozzle of 2.1 mm in inner diameter and 8 mm in length at 372° C. under Synthesis Example 1

51.8 L of pure water was charged in a 174 L-volume autoclave; nitrogen replacement was sufficiently carried out; thereafter, 40.9 kg of perfluorocyclobutane, 2.24 kg of perfluoro(propyl vinyl ether) (PPVE) and 2.64 kg of methanol were charged; and the temperature in the system was held at 35° C. and the stirring speed was held at 200 rpm. Then, tetrafluoroethylene (TFE) was introduced under pressure up to MPa, and thereafter 0.103 kg of a 50% methanol solution of di-n-propyl peroxydicarbonate was charged to initiate polymerization. Since the pressure in the system decreased along with the progress of the polymerization, TFE was continuously supplied to make the pressure constant, and 0.049 kg of PPVE was additionally charged for every 1 kg of TFE supplied. The polymerization was finished at the time when the amount of TFE additionally charged reached 40.9 kg. Unreacted TFE was released to return the pressure in the autoclave to the atmospheric pressure, and thereafter, an obtained reaction product was washed with water and dried to thereby obtain 42.9 kg of a powder.

The obtained powder was melt extruded at 360° C. by a screw extruder (trade name: PCM46, manufactured by Ikegai Corp.) to thereby obtain pellets of a TFE/PPVE copolymer. By using the obtained pellets, the PPVE content was measured by the above-mentioned method.

The obtained pellets were put in a vacuum vibration-type reactor VVD-30 (manufactured by Okawara MFG. Co., Ltd.), and heated to 210° C. After vacuumizing, $F_2$ gas diluted to 20% by volume with $N_2$ gas was introduced to the atmospheric pressure. 0.5 hour after the $F_2$ gas introduction, vacuumizing was once carried out and the $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 210° C. for 10 hours. After the reaction was finished, the reactor interior was replaced sufficiently by $N_2$ gas to finish the fluorination reaction. By using the fluorinated pellets, the above physical properties were measured by the methods described above.

Synthesis Example 2

Fluorinated pellets were obtained as in Synthesis Example 1, except for changing the charged amount of PPVE to 2.56 kg, changing the charged amount of methanol to 2.29 kg, and adding kg of PPVE for every 1 kg of TFE supplied, to thereby obtain 43.1 kg of a dry powder.

Synthesis Example 3

Fluorinated pellets were obtained as in Synthesis Example 1, except for changing the charged amount of PPVE to 2.56 kg, changing the charged amount of methanol to 2.60 kg, and adding kg of PPVE for every 1 kg of TFE supplied, to thereby obtain 43.1 kg of a dry powder.

Synthesis Example 4

Fluorinated pellets were obtained as in Synthesis Example 1, except for changing the charged amount of PPVE to 2.81 kg, changing the charged amount of methanol to 2.51 kg, and adding kg of PPVE for every 1 kg of TFE supplied, to thereby obtain 43.3 kg of a dry powder.

Synthesis Example 5

Fluorinated pellets were obtained as in Synthesis Example 1, except for changing the charged amount of PPVE to 1.73 kg, changing the charged amount of methanol to 4.70 kg, and adding kg of PPVE for every 1 kg of TFE supplied, to thereby obtain 42.6 kg of a dry powder.

Synthesis Example 6

Fluorinated pellets were obtained as in Synthesis Example 1, except for changing the charged amount of PPVE to 3.60 kg, changing the charged amount of methanol to 0.55 kg, and adding kg of PPVE for every 1 kg of TFE supplied, to thereby obtain 43.9 kg of a dry powder.

Synthesis Example 7

Fluorinated pellets were obtained as in Synthesis Example 1, except for changing the charged amount of PPVE to 2.81 kg, changing the charged amount of methanol to 4.78 kg, changing the charged amount of the 50% methanol solution of di-n-propyl peroxydicarbonate to 0.051 kg, and adding 0.059 kg of PPVE for every 1 kg of TFE supplied, to thereby obtain 43.3 kg of a dry powder.

Synthesis Example 8

Fluorinated pellets were obtained as in Synthesis Example 1, except for changing the charged amount of PPVE to 2.69 kg, changing the charged amount of methanol to 3.47 kg, and adding 0.057 kg of PPVE for every 1 kg of TFE supplied, to thereby obtain 43.2 kg of a dry powder.

Synthesis Example 9

Non-fluorinated pellets were obtained as in Synthesis Example 1, except for changing the charged amount of PPVE to 2.75 kg, changing the charged amount of methanol to 3.02 kg, and adding 0.058 kg of PPVE for every 1 kg of TFE supplied, to thereby obtain 43.3 kg of a dry powder.

By using the pellets obtained in Synthesis Examples, the above physical properties were measured by the methods described above. The results are shown in Table 3.

TABLE 3

| | PPVE content (% by mass) | MFR (g/10 min) | Melting point (° C.) | Number of functional groups (number/$C10^6$) |
|---|---|---|---|---|
| Synthesis Example 1 | 4.7 | 38.0 | 304 | <6 |
| Synthesis Example 2 | 5.2 | 42.0 | 302 | 28 |
| Synthesis Example 3 | 5.2 | 46.0 | 302 | <6 |
| Synthesis Example 4 | 5.6 | 55.0 | 302 | <6 |
| Synthesis Example 5 | 3.9 | 48.3 | 305 | <6 |
| Synthesis Example 6 | 6.8 | 56.0 | 298 | <6 |
| Synthesis Example 7 | 5.6 | 30.9 | 302 | <6 |
| Synthesis Example 8 | 5.4 | 65.1 | 302 | <6 |
| Synthesis Example 9 | 5.5 | 55.0 | 302 | 352 |

The description of "<6" in Table 3 means that the number of functional groups is less than 6.

Experimental Examples 1 to 4 and Comparative Examples 1 to 5

By using the pellets obtained in Synthesis Examples 1 to 9, injection molded articles were prepared by the following method.

Injection Molded Article (1) (Reference Example)

The pellets were injection molded by using an injection molding machine (SE50EV-A, manufactured by Sumitomo Heavy Industries, Ltd.) and setting the cylinder temperature to 370° C., the mold temperature to 160° C. and the injection speed to 10 mm/s, to thereby prepare an injection molded article (1) having a shape shown in the FIGURE and Table 4.

Injection Molded Article (2) (Reference Example)

The pellets were injection molded by using an injection molding machine (SE50EV-A, manufactured by Sumitomo Heavy Industries, Ltd.) and setting the cylinder temperature to 370° C., the mold temperature to 160° C. and the injection speed to 10 mm/s, to thereby prepare an injection molded article (11 cm×4 cm×0.80 cmt). The obtained sheet-shape injection molded article was cut, to thereby prepare an injection molded article (2) (8 cm×1 cm×0.8 cmt) imitating the side surface section of the injection molded article shown in the FIGURE.

Injection Molded Article (3)

The pellets were injection molded by using an injection molding machine (SE50EV-A, manufactured by Sumitomo Heavy Industries, Ltd.) and setting the cylinder temperature to 370° C., the mold temperature to 160° C. and the injection speed to 10 mm/s, to thereby prepare an injection molded article (3) having a shape shown in the FIGURE and Table 4.

Injection Molded Article (4)

The pellets were injection molded by using an injection molding machine (SE50EV-A, manufactured by Sumitomo Heavy Industries, Ltd.) and setting the cylinder temperature to 370° C., the mold temperature to 160° C. and the injection speed to 10 mm/s, to thereby prepare an injection molded article (11 cm×4 cm×0.29 cmt). The obtained sheet-shape injection molded article was cut, to thereby prepare an injection molded article (4) (8 cm×1 cm×0.29 cmt) imitating the side surface section of the injection molded article shown in the FIGURE.

Injection Molded Article (5)

The pellets were injection molded by using an injection molding machine (SE50EV-A, manufactured by Sumitomo Heavy Industries, Ltd.) and setting the cylinder temperature to 370° C., the mold temperature to 160° C. and the injection speed to 10 mm/s, to thereby prepare an injection molded article (5) (9.6 cm×9.6 cm×0.35 cmt) imitating the side surface section of the injection molded article shown in the FIGURE.

Injection Molded Article (6)

The pellets were injection molded by using an injection molding machine (SE50EV-A, manufactured by Sumitomo Heavy Industries, Ltd.) and setting the cylinder temperature to 370° C., the mold temperature to 160° C. and the injection speed to 10 mm/s, to thereby prepare an injection molded article (11 cm×4 cm×0.20 cmt). The obtained sheet-shape injection molded article was cut, to thereby prepare an injection molded article (6) (3.8 cm×1.35 cm×0.2 cmt) imitating the side surface section of the injection molded article shown in the FIGURE.

Injection Molded Article (7)

The injection molded article (3) was cut, to thereby prepare an injection molded article (7) (4.0 cm×0.1 cm×0.2 cmt) imitating the side surface section of the injection molded article shown in the FIGURE.

TABLE 4

| | | Injection molded article (1) (Reference Example) | Injection molded article (2) (Reference Example) | Injection molded article (3) | Injection molded article (4) | Injection molded article (5) | Injection molded article (6) | Injection molded article (7) |
|---|---|---|---|---|---|---|---|---|
| Specific gravity of side surface section | g/cm³ | 2.15 | 2.15 | 2.15 | 2.15 | 2.15 | 2.15 | 2.15 |
| Height (H) | cm | 2.0 | 8.0 | 5.5 | 8.0 | 9.6 | 3.8 | 4.0 |
| Thickness (T) | cm | 0.20 | 0.80 | 0.20 | 0.29 | 0.35 | 0.20 | 0.20 |
| Height (H)/thickness (T) | | 10.0 | 10.0 | 27.5 | 27.6 | 27.4 | 19.0 | 20.0 |
| Load applied to lower end section of side surface section | kPa | 0.42 | 1.69 | 1.16 | 1.69 | 2.02 | 0.80 | 0.84 |

The injection molded articles obtained above were evaluated according to the following methods. The results are shown in Table 5.

(Evaluation of APPEARANCE)

The appearance of the injection molded article (1) and the injection molded article (3) was evaluated by the following criteria.

Good: the mold was sufficiently filled with the copolymer, and the entire surface of the obtained formed article was smooth.

Poor: the mold was not sufficiently filled with the copolymer (Load Deflection Rate at 80° C.)

The injection molded article (2) and the injection molded article (4) were heated in an electric furnace at 100° C. for 20 hours. Except for using the obtained test piece, the test was carried out according to a method described in JIS K-K 7191-1 using a heat distortion tester (manufactured by YASUDA SEIKI SEISAKUSHO, LTD.) under the conditions of at a test temperature of 30 to 150° C., a temperature-increasing rate of 120° C./hour, a bending stress of 1.8 MPa and a flatwise method. The load deflection rate was determined by the following formula. An injection molded article having a low load deflection rate at 80° C. is excellent in the deformation resistance at high temperatures.

$$\text{Load deflection rate (\%)} = a2/a1 \times 100$$

a1: the test piece thickness before test (mm)
a2: the amount of deflection at 80° C. (mm)
(Abrasion Test)

The injection molded article (5) was fixed on a test bench of a Taber abrasion tester (No. 101 Taber type abrasion tester with an option, manufactured by YASUDA SEIKI SEISAKUSHO, LTD.) and the abrasion test was carried out at a test piece surface temperature of 150° C. and a load of 500 g, using an abrasion wheel CS-10 (rotationally polished in 20 rotations with an abrasive paper #240) and at a rotation rate of 60 rpm by using the Taber abrasion tester. The weight of the test piece after 1,000 rotations was measured, and the same test piece was further subjected to the test of 8,500

$N/mm^2$, the sample was allowed to stand at 240° C., and the displacement (mm) of the length of the sample from the time point 70 min after the start of the test until the time point 300 min after the start of the test was measured to thereby calculate the proportion (tensile creep strain (%)) of the displacement of the length (mm) to the length of the initial sample length (10 mm). An injection molded article having a small tensile creep strain (%) measured under the condition of 240° C. and 300 min hardly elongates even when a tensile load is applied in a remarkably high temperature environment and is excellent in the deformation resistance at high temperatures. In Comparative Example 3, the injection molded article (7) was not successfully prepared.

TABLE 5

| | Type of copolymer | Injection molded article (1) (Reference Example) Evaluation of appearance | Injection molded article (2) (Reference Example) Load deflection rate at 80° C. | Injection molded article (3) Evaluation of appearance | Injection molded article (4) Load deflection rate at 80° C. | Injection molded article (5) Abrasion loss at 150° C. (mg) | Injection molded article (6) Bending crack test at 60° C. | Injection molded article (7) Tensile creep strain at 240° C. (%) |
|---|---|---|---|---|---|---|---|---|
| Experimental Example 1 | Synthesis Example 1 | Good | 4% | Good | 32% | 56.5 | Good | 3.09 |
| Experimental Example 2 | Synthesis Example 2 | Good | 5% | Good | 35% | 55.6 | Good | 3.56 |
| Experimental Example 3 | Synthesis Example 3 | Good | 5% | Good | 35% | 57.3 | Good | 3.56 |
| Experimental Example 4 | Synthesis Example 4 | Good | 5% | Good | 37% | 58.7 | Good | 3.99 |
| Comparative Example 1 | Synthesis Example 5 | Good | 4% | Good | 27% | 65.5 | Poor | 2.46 |
| Comparative Example 2 | Synthesis Example 6 | Good | 6% | Good | 45% | 51.6 | Good | 5.69 |
| Comparative Example 3 | Synthesis Example 7 | Good | 5% | Poor | 37% | 49.0 | Good | — |
| Comparative Example 4 | Synthesis Example 8 | Good | 5% | Good | 36% | 64.0 | Poor | 3.77 |
| Comparative Example 5 | Synthesis Example 9 | Good | 5% | Good | 36% | 59.2 | Good | 4.57 | rotations and thereafter, the weight thereof was measured. The abrasion loss was determined by the following formula.

Abrasion loss (mg)=$M1-M2$

M1: the weight of the test piece after the 1,000 rotations (mg)
M2: the weight of the test piece after the 8,500 rotations (mg)
(Bending Crack Test)

A notch was formed on the middle of the long side of three injection molded articles (6) according to ASTM D1693 by a blade of 19 mm×0.45 mm. Then, the three notched test pieces obtained were mounted on a stress crack test jig according to ASTM D1693, and heated in an electric furnace at 60° C. for 24 hours; thereafter, the notches and their vicinities were visually observed and the number of cracks was counted. The injection molded article in which cracks are hardly generated in the bending crack test is excellent in the crack resistance at high temperatures.

Good: the number of cracks was 0
Poor: the number of cracks was 1 or more
(Tensile Creep Test)

The tensile creep strain was measured by using TMA-7100 manufactured by Hitachi High-Tech Science Corporation. The injection molded article (7) was used as a sample. The sample was mounted on measurement jigs with a 10 mm distance between jigs. A load was applied to the sample such that the load on the cross-section was 2.41

As shown in the results of the abrasion loss and the bending crack test of Comparative Example 1, it is found that, when the content of the FAVE unit of the copolymer is too low, the injection molded article is likely abraded at high temperatures and cracks are likely generated at high temperatures. These results mean that, the load applied to the lower end section of the side surface section (the peripheral edge section of the bottom surface) is large due to the large height of the side surface section of the injection molded article or the like, the lower end section of the side surface section (the peripheral edge section of the bottom surface) of the injection molded article is likely abraded and damaged at high temperatures.

As shown in the results of the load deflection rate at 80° C. of Comparative Example 2, when the thickness of the side surface section of the injection molded article is large, the side surface section of the injection molded article does not largely deform, although the load deflection rate at 80° C. is slightly large (see the results of the injection molded article (2)). On the other hand, when the thickness of the side surface section of the injection molded article is small and the content of the FAVE unit of the copolymer is too high, the injection molded article likely deflects at high temperatures (see the results of the injection molded article (4)). These results mean that the side surface section of the injection molded article likely deforms at high temperatures when the thickness of the side surface section of the injection molded article is small.

As described above, it is found from the results of Comparative Example 1 and Comparative Example 2 that the achievement of both the abrasion resistance at high temperatures and the crack resistance at high temperatures, as well as the deformation resistance at high temperatures of the injection molded article is difficult, when the height of the side surface section of the injection molded article is large and the thickness of the side surface section thereof is small.

As shown in the results of the evaluation of moldability of Comparative Example 3, when the height of the side surface section of the injection molded article is small, an injection molded article excellent in the appearance is obtained (see the results of the injection molded article (1)). On the other hand, when the height of the side surface section of the injection molded article is large and the MFR of the copolymer is too low, it is difficult to obtain an injection molded article excellent in the appearance (see the results of the injection molded article (3)).

As shown in the results of the abrasion loss and the bending crack test of Comparative Example 4, it is found that, when the MFR of the copolymer is too high, the injection molded article is likely abraded at high temperatures and cracks are likely generated at high temperatures. These results mean that, the load applied to the lower end section of the side surface section (the peripheral edge section of the bottom surface) is large due to the large height of the side surface section of the injection molded article or the like, the lower end section of the side surface section (the peripheral edge section of the bottom surface) of the injection molded article is likely abraded and damaged at high temperatures.

As described above, it is found from the results of Comparative Example 3 and Comparative Example 4 that the achievement of both the beautiful appearance of the injection molded article, as well as the abrasion resistance at high temperatures and crack resistance at high temperatures of the injection molded article is difficult, when the height of the side surface section of the injection molded article is large and the thickness of the side surface section thereof is small.

In contrast, as shown in the results of Experimental Examples 1 to 4, it was found that the injection molded article excellent in the abrasion resistance at high temperatures, the crack resistance at high temperatures and the deformation resistance at high temperatures, and having a beautiful appearance can be obtained by suitably adjusting the content of the PAVE unit, the MFR and the number of functional groups of the copolymer constituting the injection molded article, even when the height of the side surface section of the injection molded article is made large and the thickness of the side surface section is made small.

REFERENCE SIGNS LIST

10 Injection molded article
1 Bottom surface section
2 Side surface section
21 Upper end section of side surface section
22 Lower end section of side surface section (peripheral edge section of bottom surface section)
3 Opening

The invention claimed is:

1. An injection molded article comprising a bottom surface section, and a side surface section erected from a peripheral edge of the bottom surface section, wherein
   a height from the bottom surface section of the side surface section is 3.8 cm or larger,
   a ratio of a height from the bottom surface section of the side surface section to an average thickness of the side surface section (height/thickness) is 19.0 or more,
   a load applied to a lower end section of the side surface section is 0.8 kPa or higher,
   the injection molded article comprises a copolymer comprising tetrafluoroethylene unit and a fluoro(alkyl vinyl ether) unit,
   a content of the fluoro(alkyl vinyl ether) unit of the copolymer is 4.5 to 6.0% by mass with respect to the whole of the monomer units, a melt flow rate at 372° C. of the copolymer is 35.0 to 60.0 g/10 min, and the total number of —CF=CF$_2$, —CF$_2$H, —COF, —COOH, —COOCH$_3$, —CONH$_2$ and —CH$_2$OH of the copolymer is 50 or less per $10^6$ main-chain carbon atoms.

2. The injection molded article according to claim 1, wherein a specific gravity of the side surface section is 2.05 to 2.25 g/cm$^3$.

3. The injection molded article according to claim 1, wherein the shape of the bottom surface section is a substantially circular shape or a substantially elliptical shape.

4. The injection molded article according to claim 1, further comprising an opening formed on an upper end of the side surface section.

5. The injection molded article according to claim 1, wherein the fluoro(alkyl vinyl ether) unit of the copolymer is perfluoro(propyl vinyl ether) unit.

6. The injection molded article according to claim 1, wherein the content of the fluoro(alkyl vinyl ether) unit of the copolymer is 4.7 to 5.6% by mass with respect to the whole of the monomer units.

7. The injection molded article according to claim 1, wherein the melt flow rate at 372° C. of the copolymer is 38.0 to g/10 min.

8. The injection molded article according to claim 1, wherein the melting point of the copolymer is 295 to 315° C.

* * * * *